United States Patent
Bartz et al.

(10) Patent No.: US 10,663,047 B2
(45) Date of Patent: May 26, 2020

(54) DEVICE COMPRISING A TRANSMISSION ASSEMBLY HAVING AN OVERRIDE CLUTCH WITH A FREEWHEELING MEMBER

(71) Applicant: SIEMENS AKTIENGESELLSCHAFT, Munich (DE)

(72) Inventors: Michael Bartz, Berlin (DE); Oliver Duwe, Brandenburg an der Havel (DE); Friedrich Loebner, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 304 days.

(21) Appl. No.: 15/531,314

(22) PCT Filed: Oct. 26, 2015

(86) PCT No.: PCT/EP2015/074709
§ 371 (c)(1),
(2) Date: May 26, 2017

(87) PCT Pub. No.: WO2016/083042
PCT Pub. Date: Jun. 2, 2016

(65) Prior Publication Data
US 2017/0343089 A1 Nov. 30, 2017

(30) Foreign Application Priority Data
Nov. 28, 2014 (DE) .................. 10 2014 224 405

(51) Int. Cl.
*F16H 29/02* (2006.01)
*H01H 3/60* (2006.01)
(Continued)

(52) U.S. Cl.
CPC ............ *F16H 29/02* (2013.01); *F16H 33/06* (2013.01); *H01H 3/32* (2013.01); *H01H 3/34* (2013.01);
(Continued)

(58) Field of Classification Search
CPC .......... F16H 29/02; F16H 33/06; H01H 3/58; H01H 3/34; H01H 3/32; H01H 3/60;
(Continued)

(56) References Cited

U.S. PATENT DOCUMENTS

| | | | | |
|---|---|---|---|---|
| 3,677,102 A | * | 7/1972 | Simonetta | B25B 13/465 74/143 |
| 4,914,906 A | * | 4/1990 | Burch | F02C 7/277 192/42 |
| 4,927,196 A | * | 5/1990 | Girard | E05B 81/20 292/201 |
| 4,957,207 A | * | 9/1990 | Thomas | B63B 23/00 114/362 |
| 8,210,331 B2 | * | 7/2012 | Keshtkar | F16D 41/12 192/41 R |

(Continued)

FOREIGN PATENT DOCUMENTS

| DE | 1134445 B | 8/1962 |
|---|---|---|
| EP | 0954892 B1 | 5/2001 |

(Continued)

*Primary Examiner* — Victor L Macarthur
(74) *Attorney, Agent, or Firm* — Laurence Greenberg; Werner Stemer; Ralph Locher

(57) ABSTRACT

A device includes a transmission assembly having a first override clutch. The first override clutch is used especially for transmitting a torque between a first coupling partner and a second coupling partner. The first override clutch engages and disengages in accordance with a change in the load flow between the coupling partners. A freewheeling member which is associated with the first override clutch neutralizes the engagement between the coupling partners. The neutralization is, in particular, temporary.

13 Claims, 4 Drawing Sheets

(51) Int. Cl.
  *H01H 3/54* (2006.01)
  *H01H 3/32* (2006.01)
  *F16H 33/06* (2006.01)
  *H01H 3/34* (2006.01)
  *H01H 3/58* (2006.01)
  *H01H 3/30* (2006.01)
  *H01H 3/50* (2006.01)

(52) U.S. Cl.
  CPC ............... *H01H 3/54* (2013.01); *H01H 3/58* (2013.01); *H01H 3/60* (2013.01); *H01H 3/3021* (2013.01); *H01H 3/50* (2013.01)

(58) Field of Classification Search
  CPC .......... H01H 3/54; H01H 3/3021; H01H 3/50; F16D 41/00; F16D 41/12; F16D 41/02; F16D 41/04; F16D 45/00; F16D 43/20; F16D 43/22; F16D 43/24; F16D 43/26; F16D 43/202
  See application file for complete search history.

(56) References Cited

U.S. PATENT DOCUMENTS

| | | | |
|---|---|---|---|
| 2012/0083383 A1* | 4/2012 | Steuer | F16D 41/26 |
| | | | 192/41 R |
| 2013/0220760 A1* | 8/2013 | Tsao | F16D 15/00 |
| | | | 192/45.1 |
| 2013/0341166 A1* | 12/2013 | Albrecht | H01H 3/44 |
| | | | 200/11 TC |
| 2016/0186821 A1* | 6/2016 | Alley | F16D 41/30 |
| | | | 192/45.1 |
| 2016/0265609 A1* | 9/2016 | Corsetti | F16D 41/30 |
| 2018/0298961 A1* | 10/2018 | Campton | F16D 41/16 |

FOREIGN PATENT DOCUMENTS

| | | |
|---|---|---|
| RU | 2299366 C1 | 5/2007 |
| WO | 2009056373 A1 | 5/2009 |
| WO | 2014114489 A1 | 7/2014 |

\* cited by examiner

DEVICE COMPRISING A TRANSMISSION ASSEMBLY HAVING AN OVERRIDE CLUTCH WITH A FREEWHEELING MEMBER

BACKGROUND OF THE INVENTION

Field of the Invention

The invention relates to a device comprising a transmission assembly having a first override clutch, in particular for transmitting a torque, which has a first coupling partner and a second coupling partner that engage or disengage depending on a change in a load flow between the coupling partners.

A device of this type is known from the German publication of the examined application DE 1134445, for example. A device which has a transmission assembly for tensioning a spring-loaded mechanism is described therein. The transmission assembly therein is also equipped with a first override clutch which serves for transmitting a torque. The override clutch herein has a first coupling partner and a second coupling partner. Engaging or disengaging is performed depending on a change in the load flow between the coupling partners. A space-saving construction results from an assembly of this type, wherein there is the potential for performing re-tensioning of the spring-loaded mechanism therein.

The override clutch therein has a robust construction, on account of which high torques can be transmitted in a reliable manner. The coupling behavior of the known override clutches is to be considered harsh, on account of which impulses can be fed into the transmission assembly therein when the coupling partners are being engaged or disengaged, respectively. Impulses of this type can lead to malfunctions and additional mechanical stress within the device, on account of which the durability of the device therein can be compromised.

SUMMARY OF THE INVENTION

Accordingly, it is an object of the invention to configure a device comprising a transmission assembly of the type mentioned at the outset in such a manner that long-term stable operation is enabled.

In the case of a device of the type mentioned at the outset, the object is achieved according to the invention in that the first override clutch is assigned a freewheeling member which in particular temporarily neutralizes an engagement of the coupling partners.

The coupling partners of an override clutch are movable relative to one another. For example, the coupling partners can perform a linear relative movement or else an angular relative movement, etc., in relation to one another. However, the coupling partners should preferably serve for transmitting a torque, wherein the coupling partners are disposed so as to be mutually rotatable. The rotation axes of the coupling partners should preferably be aligned so as to be mutually coaxial. The coupling partners in the engaged state perform a synchronous movement, that is to say that the slippage between the coupling partners preferably trends toward zero. A rotating movement (or optionally another form of movement) is transmittable from the one coupling partner to the other coupling partner by means of the override clutch, in manner depending on the direction of a load flow. The coupling partners are disposed so as to be movable in relation to one another. The coupling partners can be mutually separated, that is to say disengaged, in a manner depending on the load flow direction/a change in the load flow between the coupling partners such that a transmission of force or torque, respectively, between the coupling partners is interrupted. An engagement of the coupling partners can arise upon a reversal of the load flow direction, on account of which a transmission of force or torque, respectively, between the coupling partners occurs. On an override clutch which transmits a rotating movement, the one coupling partner can be the driving coupling partner, on account of which a load flow can be transmitted to a driven coupling partner when the latter is engaged. A disengagement (load flow change) arises in the case of overriding of the driving coupling partner by the driven coupling partner. It is thus possible, for example, for a preferred (permissible) load flow direction to be provided within a transmission, and for disengaging to be provided in the case of a reversal of the load flow, for example in the case of an undesirable and more rapid movement of the driven coupling partner.

Depending on the requirement, the override clutch can be constructed in various ways. For example, the override clutch can be embodied as a clamping-body freewheel, wherein clamping bodies are moved to a clamping position, in a manner depending on a load flow, and a transmission of force or torque, respectively, can thus be performed. Alternatively, override clutches can also be embodied in the manner of a blocking ratchet or else in the manner of a wrap spring, etc. All these override clutches have in common that disengaging or engaging of the override clutch is performed in the case of a change in the load flow between the two coupling partners. It is usually advantageous for an engagement or disengagement to take place immediately, as soon as a change in the load flow arises. This leads to a rapid response of the override clutch being able to be implemented. A rapid response can lead to undesirable impulses within the transmission assembly, which can spread to further transmission elements. In particular, bearing seats, shafts, guide elements, etc. can wear out prematurely, or have to be designed in an oversized manner so as to correspond to the impulses expected, respectively.

Should one now provide the use of a freewheeling member, said freewheeling member can be utilized for in particular temporarily neutralizing an engagement of the coupling partners, that is to say that an immediate engagement of the coupling partners can be permitted in the case of a change in the load flow, wherein the freewheeling member at least transitionally neutralizes the effect of the coupled coupling partners. The freewheeling member can act as a dead-time element, for example, on account of which a passive movement by way of the freewheeling member is enabled. An impulse that emanates from an engagement of the coupling partners can be dissipated while said passive movement is being performed, on account of which the effect of said impulse on further transmission elements is reduced. The freewheeling member herein can preferably be designed in such a manner that the freewheeling member, only at the commencement of a load change on the override clutch, is effective for a specific temporal interval. This temporal interval can be determined by dimensioning a free path section (passive movement) of the freewheeling member. The freewheeling member can also have an absorption element, for example, which receives the energy of the impulse. For example, absorption elements which upon engagement are subjected to a reversible deformation can be provided. An engagement impulse can be damped in the freewheeling member. It is an advantage of an assembly of this type that the structure of the override clutch is maintained, and the engagement in a time-delayed manner is performed only by the assigned freewheeling member. Disengaging can be performed immediately such that the freewheeling member does not influence any disengagement.

A further advantageous design embodiment can provide that the freewheeling member has a freewheeling path section which is larger than a path section of an engagement movement required for engaging the coupling partners.

The freewheeling member can permit a freewheeling path section within which a passive movement of one of the coupling partners is enabled. The freewheeling path section herein is to be designed to be larger than the path section that is required for engaging the coupling partners in the case of a change in the load flow. On account thereof, there is the potential for engaging to be performed almost simultaneously with the start of a passive movement/freewheeling movement on the freewheeling member, for example, wherein upon coupling being performed there is still a sufficient reserve in the freewheeling path section in order for an engagement impulse to be neutralized. A freewheeling movement can be performed conjointly with an increase in resistance, for example, such that a deceleration of the freewheeling movement is performed as the passage through the freewheeling path section progresses. An in particular reversibly deformable absorption element can be utilized for the deceleration, for example. A conversion or an "absorption" of an engagement impulse of the override clutch can advantageously be achieved on the freewheeling member.

It can furthermore be advantageously provided that one of the coupling partners is connected to a first detent.

The utilization of a detent enables a delimitation of the free path section in the freewheeling member to be performed, for example. The first detent herein can preferably be moved counter to an effect of a force. The force counter to which the detent has to be moved can preferably increase as the free path section of the coupling partner increases. A freewheeling movement of the second coupling partner, for example, can be delimited by way of the first detent. The free path section of the freewheeling member can be established by positioning the first detent. The first detent can be connected indirectly of directly to a coupling partner. A bond that is rigid in angular terms between the first detent and both coupling partners can be present in particular in the engaged state.

One advantageous design embodiment can provide that an elastic connection of one coupling partner to a further transmission element is formed by way of the freewheeling member.

The freewheeling member can form an elastic connection of one coupling partner to a further transmission element, so as to dampen a movement of the coupling partner, for example while passing a freewheeling path section of the freewheeling member. It is thus possible, for example, to provide an elastomer which is deformed when the freewheeling member enters into action, that is to say when the coupling partners engage and there is a neutralizing effect by the freewheeling member. Furthermore, alternative reversibly deformable elements which likewise effect damping of a movement of one of the coupling partners, in particular in the engaged state, can also be utilized. It is possible, for example, for the elastic connection to be positioned on a locationally fixed bearing, on the one hand, and for a connection to one of the coupling partners to be provided, on the other hand, such that tensioning of the elastic connection in the engaged state is performed during the action of the freewheeling member.

It can herein be advantageously provided that the first override clutch forms a bearing for a shaft.

The first override clutch can serve as a bearing for a shaft. There is thus the possibility that a rotating movement of the shaft in the first override clutch that acts as a bearing is enabled, on the one hand, and in the case of a reversal of the rotation direction of the shaft a rotating movement in the opposite direction can be blocked by the first override clutch, on the other hand. The first override clutch engages since a change in the load flow arises on the override clutch, for example, by virtue of a change of the rotation direction of the shaft. Neutralizing the blocking of a rotating movement is performed by way of the freewheeling member, despite the engagement of the coupling partners. To this end, the freewheeling member can be embodied in the manner of a sleeve, for example, wherein the sleeve is movable in a rotating manner counter to a spring force, for example. A rotating movement of this type can be driven by engaging the coupling partners of the first override clutch. Any blocking of an undesirable rotating movement by the freewheeling member (a sleeve, for example) can be neutralized by engaging the coupling partners, such that an immediate blocking of the shaft is prevented. Instead, the freewheeling member in the case of engaged coupling partners enables a limited rotating movement of the shaft.

It can be furthermore advantageous that a second override clutch is coupled to the shaft.

On its part, that shaft having the first override clutch can be connected to a second override clutch. The second override clutch can sit directly on the shaft, for example. However, it can also be provided that the second override clutch is connected to the shaft by way of a positive- or negative-ratio transmission. The first and the second override clutches can operate in a mutually independent manner and can influence one another by way of a connection of each one of the coupling partners.

It can herein be advantageously provided that the first and the second override clutches have blocking actions in the same direction.

By providing blocking actions of the first and of the second override clutch in the same direction, there is the possibility for providing the second override clutch for the transmission of a movement on the transmission assembly, for example, whereas the first override clutch serves for mounting a shaft. Accordingly, a blocking direction and a freewheeling direction result on the shaft, said directions in turn being in interaction with the second override clutch. For example, jamming or blocking, respectively, that arises between the coupling partners of the second override clutch by way of the freewheeling member of the first override clutch on the second override clutch can thus be resolved by the entry into action of the freewheeling member.

It can be furthermore advantageously provided that the freewheeling member enables a movement between a first and a second delimitation detent by one of the coupling partners, in particular in the engaged state.

In a manner independent of the coupling state, a movement of one of the coupling partners, in particular in the engaged state, between a first and a second delimitation element can be enabled by way of the freewheeling member. The first and the second delimitation element delimit a free path section of the freewheeling member along which at least one of the coupling partners can be moved in a reciprocating manner. In the engaged state, that is to say in the blocked state of the two coupling partners, when the first override clutch is used as a bearing for a shaft, it is thus possible, for example, for immediate blocking of a rotating movement of the shaft to be prevented when the first override clutch engages. An entry into action of the engagement of the coupling partners is delayed. Furthermore, a damped entry into action of the engaged coupling partners can be achieved by providing an absorption element. Engaging of the override clutch is performed according to proven principles, but the effect is neutralized/delayed by way of the freewheeling member.

One further advantageous design embodiment can provide that the freewheeling member in the case of a change in the load flow of the coupling partners resets itself in a self-acting manner.

The freewheeling member preferably has a free path section within which a relative movement of one of the coupling partners is enabled. If henceforth a reversal of the load flow between the coupling partners is utilized in order for the freewheeling member to be reset in a self-acting manner, a disengaged coupling partner, by way of disengaging the first override clutch, can perform resetting of the freewheeling member, for example. To this end, energy that is stored in an absorption element can be utilized, for example. In the case of the freewheeling member being de-stressed, energy that is stored in the absorption element can be utilized in order for resetting of the freewheeling member to be effected.

It can be furthermore advantageously provided that removal of the coupling partner from the first delimitation detent is performed counter to a restoring force.

A coupling partner can be fixed in relation to a first delimitation detent. This can be provided in particular when the load flow on the first override clutch is directed such that the coupling is disengaged. Removal of the coupling partner from the first delimitation detent can be performed by disengaging the coupling partners. To this end, the coupling partner is moved from the first delimitation detent into a free path section. The energy arising therein can be temporarily stored in order to support resetting of the coupling partner to the first delimitation element. The energy can thus be temporarily stored, for example by a spring element which is tensioned when the coupling partners of the first override clutch engage.

It can be furthermore advantageously provided that the freewheeling member effects de-stressing of coupling forces on the second override clutch.

De-stressing of the second override clutch from coupling forces can be effected by the freewheeling member on the first override clutch. Blocking of the coupling partners of the second override clutch when the coupling partners of the latter engage can thus be performed by virtue of a reversal of the load flow, for example. By way of the freewheeling element on the first override clutch entering into action, blocking forces on the second override clutch can be relaxed by a freewheeling movement of the freewheeling member on the first override clutch. The device is thus kept free from undesirable blocking forces. Engaging torques are furthermore neutralized by the freewheeling member.

One further advantageous design embodiment can provide that the device has a spring-loaded mechanism.

A spring-loaded mechanism is an energy-storage device that is loaded by an input of spring-tensioning work. The device having the transmission assembly can serve for loading the spring-loaded mechanism. For example, to this end the transmission assembly can drive a so-called spring-tensioning shaft which is equipped with a crank on which a con-rod sits, and which converts a rotating movement of the crank to a linear movement and thus performs loading of a storage spring of the spring-loaded mechanism. By virtue of the construction, dead centers which when crossed cause a change in the load flow on the tensioning shaft and on elements of the transmission assembly that are coupled thereto arise on the crank. As a dead center is crossed, the tensioning shaft can be driven by a henceforth tensioned storage spring, on account of which a change in the load flow can arise on the first and on the second override clutch of the transmission assembly.

Latching of the spring-loaded mechanism can preferably be performed shortly after a dead center has been passed, such that the storage spring remains in the loaded position and spontaneous discharging is prevented. Bouncing back (reverse movement) of the tensioning shaft can arise upon latching, wherein the transmission assembly that is employed for tensioning the storage spring performs a minor reverse movement which is optionally even reinforced by the positive ratio of the transmission assembly. Engaging of coupling partners, in particular of the second override clutch, can arise by way of this reverse movement, on account of which a change in the load flow can also arise on the first override clutch. The first override clutch that hitherto has been freewheeling is engaged by the reversal of the load flow, wherein engaging is initially neutralized by the freewheeling member. On account thereof, despite the first and the second override clutch being engaged, a limited movement potential of the shaft that is mounted in the second override clutch is achieved, said movement potential being able to relax blocking forces of the coupling partners, in particular of the second override clutch.

One further advantageous design embodiment can provide that the transmission assembly is part of a spring-loaded mechanism drive.

A spring-loaded mechanism drive is a drive which can impart a movement. In order for a movement to be imparted, a storage spring of a spring-loaded mechanism is initially loaded, said storage spring in the loaded state being blocked by means of a latching installation. The storage spring can relax as the latching installation is released, on account of which a movement is imparted by the spring-loaded mechanism drive. By virtue of the override clutch, re-tensioning of the storage spring can already be performed upon relaxation of the spring-loaded mechanisms, on account of which re-loading of the storage spring is performed.

One further advantageous design embodiment can provide that the device has an electric switching apparatus.

An electric switching apparatus serves for switching a current path, that is to say that a current path is interrupted or a current path is closed, respectively. The electric switching apparatus herein can have switching contact pieces that are movable in relation to one another, for example, a switching path being formed between said switching contact pieces. In order for a relative movement to be generated between the switching contact pieces of the electric switching apparatus, the spring-loaded mechanism drive, or energy that is temporarily stored in the storage spring of the spring-loaded mechanism, respectively, can be used. This has the advantage that particularly rapid switching actions can be implemented by the spring-loaded mechanism drive, whereas re-loading or loading, respectively, of the storage spring of the spring-loaded mechanism drive can be performed during a comparatively long period. In the case of a corresponding design of the storage spring, the storage spring can drive a plurality of motion cycles of the switching contact pieces that are movable in relation to one another. The switching contact pieces can thus perform, for example, renewed switching off, switching on, and switching off using one and the same loaded storage spring, wherein re-loading of the storage spring is not necessary.

BRIEF DESCRIPTION OF THE SEVERAL VIEWS OF THE DRAWING

An exemplary embodiment of the invention is schematically shown in a drawing and is described in more detail hereunder.

In the figures.

DESCRIPTION OF THE INVENTION

Figure 1:
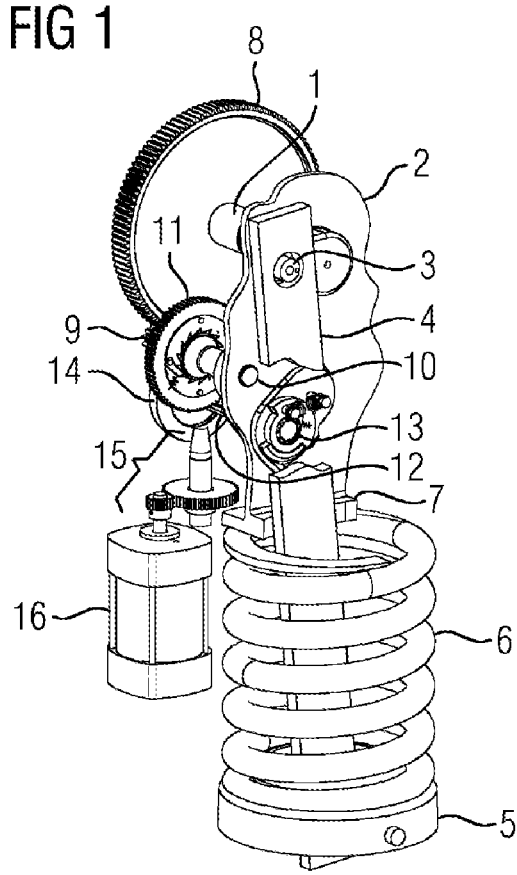
FIG. 1 shows a device having a first override clutch that is in the resting state.
Figure 2:
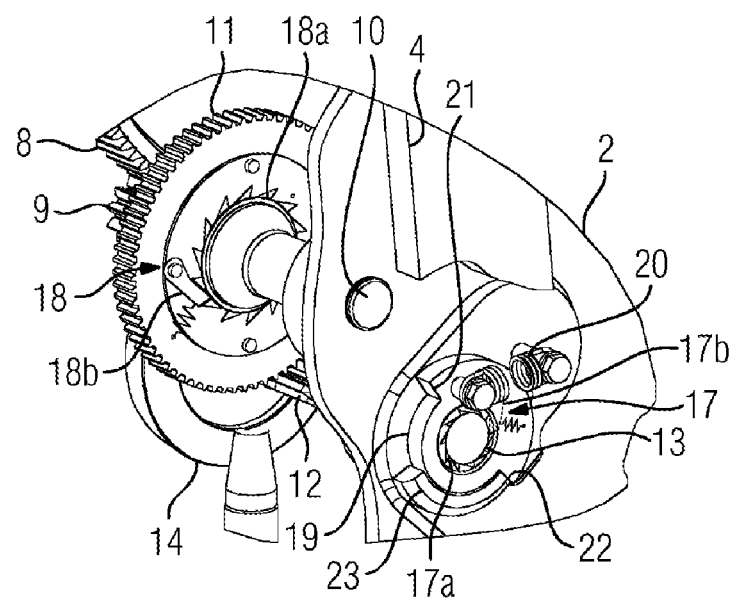
FIG. 2 shows a detail of FIG. 1.
Figure 3:
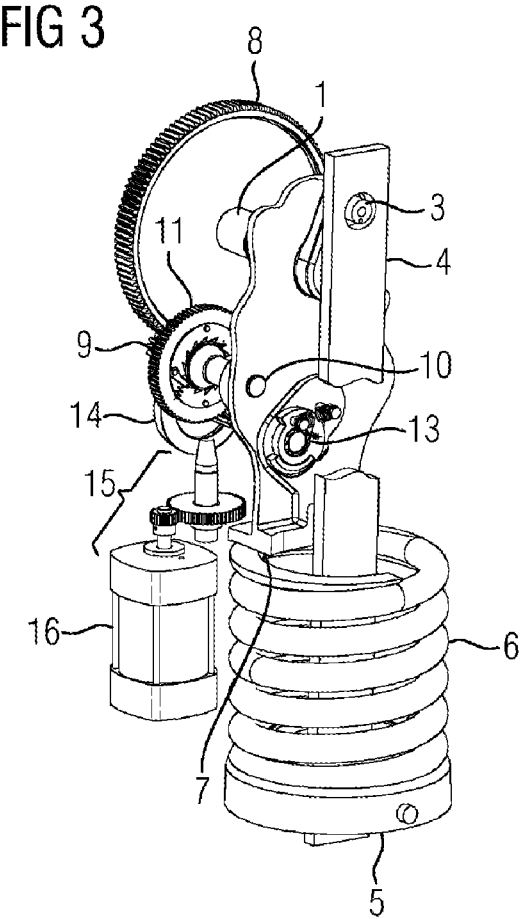
FIG. 3 shows the device known from FIG. 1 during operation of the transmission assembly.
Figure 4:
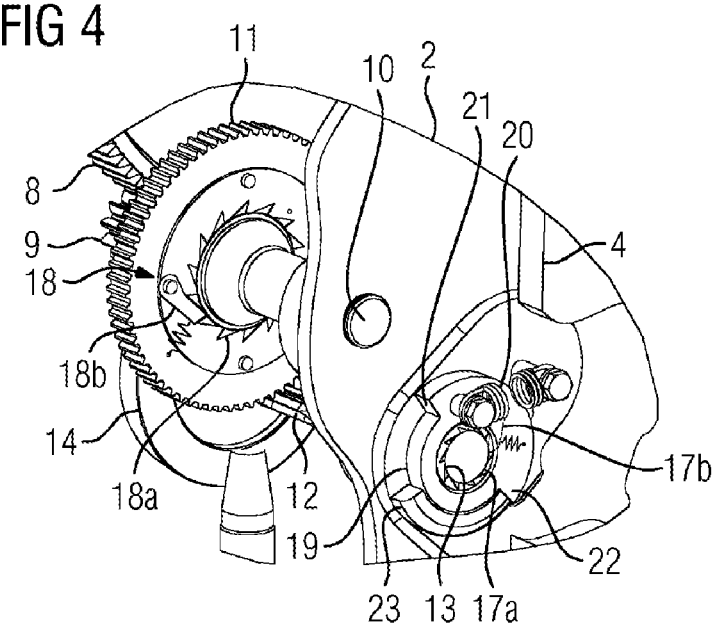
FIG. 4 shows a detail of FIG. 3.
Figure 5:
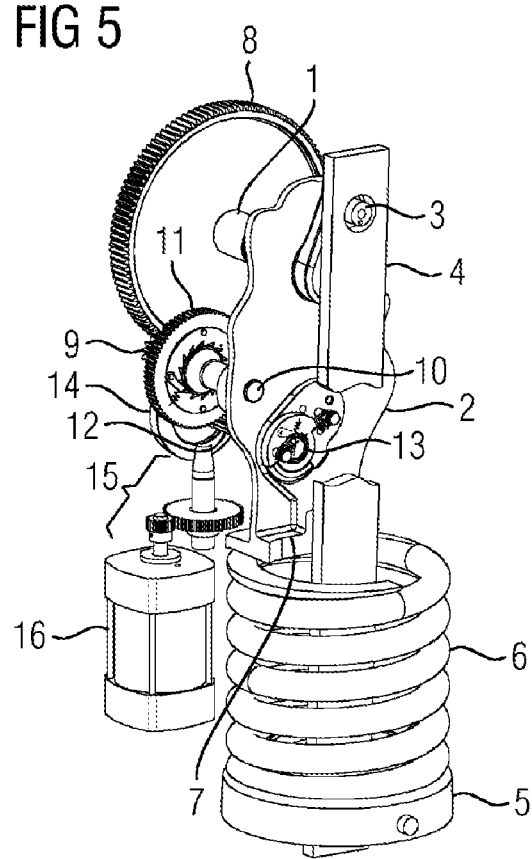
FIG. 5 shows the device known from FIG. 1 in a tensioned (latched) state.

FIG. 1 shows a device having a transmission assembly which has a tensioning shaft 1. The tensioning shaft 1 is rotatably mounted in a transmission housing 2. For reasons of clarity the transmission housing 2 is illustrated in a cut-away manner. The tensioning shaft 1 per se in the transmission housing 2 is rotatably mounted in such a manner that both a rotating movement in the clockwise direction as well as in the counter-clockwise direction are freely possible. The tensioning shaft 1 is furthermore equipped with a crank arm 3. A con-rod 4 is articulated on the crank arm 3. The con-rod 4 has a con-rod detent 5. A storage spring 6 bears on the con-rod detent 5. The storage spring 6 is presently a coil spring which is penetrated by the con-rod 4. The con-rod detent 5 bears on a front-end side end of the storage spring 6. The storage spring 6, by way of the other opposite front-end side end of the storage spring 6, bears on a receptacle plate 7. The receptacle plate 7 is presently molded as part of the transmission housing 2. The con-rod 4 is entrained in a rotation of the tensioning shaft 1. The storage spring 6 is clamped between the con-rod detent 5 and the receptacle plate 7 of the transmission housing 2. In a rotation of the tensioning shaft 1, the crank arm 3 performs a stroke, on account of which the distance between the receptacle plate 7 and the con-rod detent 5 is reduced by virtue of the connection of the con-rod detent 7 to the con-rod 4. Tensioning of the storage spring 6 is thus enabled by a rotation of the tensioning shaft 1. Further, a movement of the tensioning shaft 1 is possible by relaxing the tensioned storage spring 6. The sequence of tensioning and relaxing the storage spring 6 will be described further below by means of FIGS. 1 to 8.

A tensioning shaft gear wheel 8 is disposed on the tensioning shaft 1. The tensioning shaft gear wheel 8 has a toothing such that a rotation can be coupled onto the tensioning shaft 1, or a rotation can be coupled out of the tensioning shaft 1, respectively. The tensioning shaft gear wheel 8 meshes with a sprocket 9 of a first transmission shaft 10. The first transmission shaft 10 is aligned so as to be substantially parallel with the tensioning shaft 1, wherein a rotation of the tensioning shaft 1 and of the first transmission shaft 10 by virtue of the connection of sprocket 9 to tensioning shaft gear wheel 8 is performed in counter-rotating directions. The first transmission shaft 10 per se is mounted so as to be freely rotatable in the transmission housing 2. A first gear wheel 11 is push-fitted onto the first transmission shaft 10. The first gear wheel 11 in turn is connected to a second sprocket 12 of a second transmission shaft 13. The second transmission shaft 13 is mounted in a rotatable manner and is aligned so as to be substantially parallel with the first transmission shaft 10 and the tensioning shaft 1. A bevel gear wheel 14 which by way of a preliminary transmission 15 is connected to an electric motor 16 is disposed on the second transmission shaft 13. The electric motor 16 is actuated by way of an electric circuit and can convert electric energy to mechanical energy. A rotating movement that is imparted by the electric motor 16 is reduced in terms of gearing by the preliminary transmission 15 and is transmitted to the bevel gear wheel 14. The bevel gear wheel 14 can thus be set in rotation, on account of which the second transmission shaft 13 is rotated. A rotation can be transmitted to the first gear wheel 11 by way of the second sprocket 12 of the second transmission shaft 13, on account of which a first 37 rotating movement is transmittable to the transmission shaft 10. In turn, the latter can transmit a rotating movement to the first sprocket 9, and said rotating movement of the first sprocket 9 can be transmitted to the tensioning shaft gear wheel 8 and to the tensioning shaft 1 and the crank arm 3.

A connection of the first gear wheel 11 to the first transmission shaft 11 is established by way of a second override clutch 18. The mounting of the second transmission shaft 13 in the transmission housing 2 is performed by way of a first override clutch 17. The construction and the operating mode of the first override clutch 17 and of the second override clutch 18 are to be described in more detail hereunder by way of the fragment in FIG. 2. The second override clutch 18 has a first coupling partner 18a which is connected to the first transmission shaft 10 in a manner that is rigid in angular terms. In an exemplary manner that is symbolic for the functioning of an override clutch, the first coupling partner 18a is embodied in the manner of a leaning toothing which runs in the circumferential direction of the first transmission shaft 10. The first coupling partner 18a is connected to the first transmission shaft 10 in a manner that is rigid in angular terms. The first transmission shaft 10 per se can be interpreted as being the first coupling partner 18a. As the second coupling partner 18b, a spring-stressed ratchet is connected to the first gear wheel 11. The first gear wheel 11 per se can be interpreted as being the second coupling partner 18b. The first gear wheel 11 and the first transmission shaft 10 are thus engaged or disengaged, respectively, between the first gear wheel 11 and the first transmission shaft 10, depending on a direction of the load flow/change in the load flow. Engaging or disengaging, respectively, of the first coupling partner 18a and the second coupling partner 18b of the second override clutch 18 is performed in the case of a change in the load flow between the coupling partners 18a, 18b. On account thereof, there is the potential for a force flow to be transmitted in a desired transmission direction, for example from the first gear wheel 11 to the first transmission shaft 10 by way of the second override clutch 18. This can be of interest, for example, in order for a rotating movement emanating from the preliminary transmission 15 to be transmitted by means of the driving electric motor, by way of the second transmission shaft 13, the second sprocket 12, the first gear wheel 11, the second override clutch 18, to the first transmission shaft 10 and from there by way of the first sprocket 9 and the tensioning shaft gear wheel 8 to the tensioning shaft 1.

The first override clutch 17 is provided for mounting the second transmission shaft 13 in the transmission housing 2. The first override clutch 17 serves for positioning the second transmission shaft 13 in a rotatingly movable manner, wherein blocking of a rotating movement of the second transmission shaft 13 is performed, or a rotating movement of the second transmission shaft 13 in an opposite direction of rotation is permitted, respectively, depending on a direction of rotation of the second transmission shaft 13.

The first override clutch 17 is constructed in a manner identical to that of the second override clutch 18. A first coupling partner 17a is configured in the form of a profiled feature in the manner of a saw tooth that runs in the circumferential direction about the rotation axis of the second transmission shaft 13, wherein the first coupling partner 17a of the first override clutch is connected to the second transmission shaft 13 in a manner that is rigid in angular terms. The second transmission shaft 13 can be interpreted as being the first coupling partner 17a. The second coupling partner 17b of the first override clutch 17 is embodied in the form of a ratchet which in a spring-stressed manner is pressed against the first coupling partner 17a. On its part, the second coupling partner 17b of the first override clutch 17 is mounted in a positionally fixed manner in a sleeve 19. The sleeve 19 can be interpreted as being the second coupling partner 17b of the first override clutch 17. On its part, the sleeve 19 is mounted so as to be movable in a limited rotating manner in the transmission housing 2. Disengaging of the coupling partners 17a, 17b is performed in the case of a rotating movement of the second transmission shaft 13 in a first direction of rotation, and free rotation of the second transmission shaft 13 is possible. In the case of a reversal of the direction of rotation, that is to say in the case of a reversal of the load flow on the second transmission shaft 13, engaging of the coupling partners 17a, 17b of the first override clutch 17 is performed, on account of which a bond between the two coupling partners 17a, 17b of the first override clutch 17 that is rigid in angular terms is enforced, on account of which by virtue of the rotatingly movable mounting of the sleeve 19 the latter in the transmission housing can be moved relative to the latter in a limited rotatingly movable manner.

A rotating movement that is limited in this manner is performed counter to the force of a restoring spring 20 which is mounted on the transmission housing 2, on the one hand, and is connected to the sleeve 19, on the other hand. Driven by a rotating movement of the second transmission shaft 13 by way of engaged coupling partners 17a, 17b of the first override clutch 17, a limited rotating movement of the sleeve 19 is performed in the transmission housing 2 such that the terminal points of the restoring spring 20 are moved apart from one another. The restoring spring 20 is tensioned. It is presently provided that bolts that are aligned so as to be substantially parallel with the rotation axis of the second transmission shaft 13 and are fastened to the transmission housing 2, on the one hand, and to the sleeve 19, on the other hand, are utilized as terminal points.

As the sleeve 19, driven by a rotating movement of the second transmission shaft 13 in the case of engaged coupling partners 17a, 17b of the first override clutch 17, is increasingly torsioned, tensioning of the restoring spring 20 is performed, on account of which increasing resistance is generated as the tensioning of the restoring spring 20 increases, such that a movement of this type is decelerated by the restoring spring 20. An elastic connection of the second coupling partner 17b of the first override clutch 17 to the transmission housing 2 is provided by way of the restoring spring 20. The sleeve 19 that is mounted in a rotatingly movable manner forms a freewheeling member for the first override clutch 17, wherein said freewheeling member, in the case of the coupling partners 17a, 17b of the first override clutch 17 engaging, temporarily neutralizes the blocking action of said coupling partners 17a, 17b.

The sleeve 19 has a first detent 21 and a second detent 22. The two detents 21, 22 on the sleeve 19, by way of the connection of the second coupling partner 18b to the sleeve 19 that is rigid in angular terms, are connected to one of the coupling partners, in particular to the second coupling partner 17b. The detents 21, 22 interact with a molding 23 on the transmission housing 2. The sleeve 19 is thus enabled a limited rotating movement which corresponds to approximately three quarters of a full revolution. The angular range to be swept of a rotating movement of the sleeve 19 can optionally be enlarged or reduced by varying the positions of the detents 21, 22 of the sleeve 19, or of the molding 23, respectively. The free path section of the freewheeling member is established by determining the free angular range.

The embodiment of the override clutches 17, 18 as a blocking-ratchet freewheel is illustrated in an exemplary manner in FIGS. 1 to 8. Apart from utilizing a blocking ratchet in order for an override clutch to be implemented, other freewheels, for example based on clamping rollers, clamping elements, blocking ratchets, gear disks, wrap springs, etc. can also be employed. Irrespective of the design embodiment of the respective override clutches 17, 18, the blocking or freewheeling function, respectively, thereof in the case of a change in the load is identical.

An operational procedure of the device having a transmission assembly according to the invention is to be described hereunder by means of the sequence of FIGS. 1, 2, 3, 4, 5, 6. 7, and 8.

FIG. 1 shows a partially tensioned state of the storage spring 6. The storage spring 6 is employed in order to store energy and to release the latter on demand, for example abruptly. The potential for providing a sufficient energy reservoir in order to initiate a movement in the case of an emergency, for example, is thus provided by way of a simple mechanical construction. To this end, it can preferably be provided, for example, that the device having the transmission assembly has an electric switching apparatus which has switching contact pieces that are movable in relation to one another. The switching contact pieces herein are movable in relation to one another in order for a current path to be established, or for a current path to be interrupted, respectively. A force for generating the relative movement can be temporarily stored in the storage spring 6 and can be retrieved from said storage spring 6 on demand. This has the advantage that the storage spring 6 in the tensioned state can provide sufficient energy for generating a relative movement of the switching contact pieces even in the case of malfunctions within an electric power system, for example (electric motor 16 does not work anymore, for example). The storage spring 6 moreover has the advantage that "charging" of the storage spring 6 can be performed during comparatively long periods, wherein "discharging" of the storage spring 6 can also occur abruptly, for example, such that very rapid separation or convergence, respectively, of switching contact pieces that are movable in relation to one another can also be achieved by the device according to the invention, for example.

Proceeding from a relaxed state of the storage spring 6, the electric motor 16 is first actuated such that the latter converts electric energy to a rotating movement. A rotating movement of the bevel gear wheel 14 and of the second transmission shaft 13 is performed by way of the preliminary transmission 15, such that said second transmission shaft 13 rotates in the clockwise direction (clockwise direction based on the viewing direction onto the front end, such as is illustrated in FIGS. 1, 2, 3, 4, 5, 6, 7, and 8). In this state, a load flow on the first override clutch 17 arises in such a manner that the two coupling partners 17a, 17b of the first override clutch 18 are in freewheeling mode. The sleeve 19 is in the resting position thereof, and in the resting position thereof is secured by the restoring spring 20 and by way of the second detent 22 is pressed against the molding 23. A rotating movement of the second transmission shaft 13 in the clockwise direction is transmitted by way of the second sprocket 12 to the first gear wheel 11. A reversal of the direction of rotation on the first gear wheel 11 is performed by virtue of the coupling of the second sprocket 12 to the first gear wheel 11. As a consequence of the direction of rotation, or of the load flow from the second transmission shaft 13 to the first transmission shaft 10, respectively, engaging of the coupling partners 18a, 18b of the second override clutch 18 is performed, on account of which the rotating movement 11, driven by the electric motor 16, is also transmitted to the first transmission shaft 10. Accordingly, the first transmission shaft 10 rotates in a manner analogous to that of the first gear wheel 11 in a counter-clockwise manner. A rotating movement of the first sprocket 9 is performed conjointly with the rotating movement of the first transmission shaft 10, wherein said first sprocket 9 transmits the rotating movement to the tensioning shaft gear wheel 8, wherein a reversal of the direction of rotation is again performed here, such that the tensioning shaft gear wheel 8 and the tensioning shaft 1 rotate in a clockwise manner. This means that the crank arm 11, proceeding from the position thereof shown in FIG. 1, is pivoted in the clockwise direction. The con-rod 4 moves the con-rod detent 5 in the direction of the receptacle plate 7, on account of which compressing of the storage spring 6 is performed. This movement, driven by the electric motor 16, is performed until an upper dead center of the crank arm 3 on the tensioning shaft 1 is reached. The storage spring 6 in FIG. 3 has reached the tensioned state thereof, and pivoting of the crank arm 3 through the upper dead center is imminent. As the upper dead center is reached, or shortly upon having reached the upper dead center, the electric motor 16 is deactivated, that it to say that further driving of the tensioning shaft 1 by the electric motor 16 is no longer necessary. The tensioned storage spring 6, having passed the upper dead center, attempts to effect a reversal of the load flow on the tensioning shaft 1. In order for further undesirable discharging of the storage spring 6 to be prevented, the rotating movement of the tensioning shaft 1 or of the crank arm 3, respectively, runs counter to a ratchet mechanism (not illustrated in the figures). The ratchet mechanism blocks any further rotating movement of the tensioning shaft 1 shortly after passing the upper dead center of the crank arm 3. The movement here is one of a few degrees. A reversal of the load flow in the transmission assembly is performed as the upper dead center is passed and the tensioning shaft 1 or the crank arm 3, respectively, impacts the ratchet mechanism. The tensioning shaft 1 now drives the tensioning shaft gear wheel 8 in the clockwise direction (the electric motor 16 being switched off). This rotating movement is also transmitted by way of the sprocket 9 to the first transmission shaft 10. The first transmission shaft 10 moves counter to the clockwise direction, wherein, by virtue of the now absent driving movement of the electric motor, the (angular) velocity of the first transmission shaft 10 is greater than the (angular) velocity of the first gear wheel 11 that sits thereon. Consequently the second override clutch 18 is overridden and disengaged, on account of which a movement that is driven by a relaxation of the storage spring 6 cannot continue onward to the first gear wheel 11 or to the second transmission shaft 13, respectively.

In the case of the tensioning shaft 1 impacting a ratchet, elastic deformations can arise in the ratchet mechanism. Bouncing back of the ratchet mechanism is performed upon impact and compression of the ratchet mechanism. The rotating movement on the tensioning shaft 1 is thus reversed. In other words, the tensioning shaft immediately upon passing the upper dead center runs against a block. Until impacting arises on the ratchet mechanism, it is accepted that the transmission assembly is driven for a few degrees by the storage spring 6. A driving movement of this type by the storage spring 6 is disengaged from the electric motor or from the second transmission shaft 13, respectively, by the second override clutch 18. As an impact on the ratchet mechanism occurs, elastic deformation can take place there, on account of which, after the crank arm 3 has swung back (reversal of the elastic deformation) and a reversal of the rotating movement of the tensioning shaft 1 arises.

Figure 6:
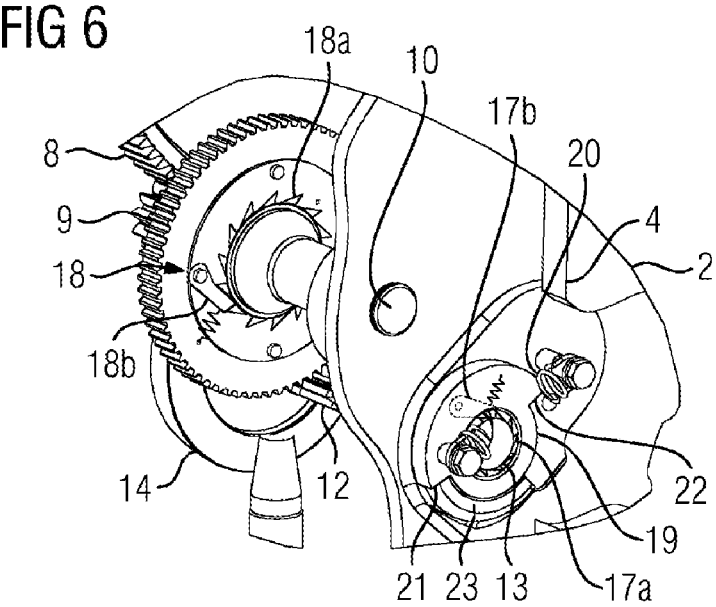
FIG. 6 shows a detail of FIG. 5.
Figure 7:
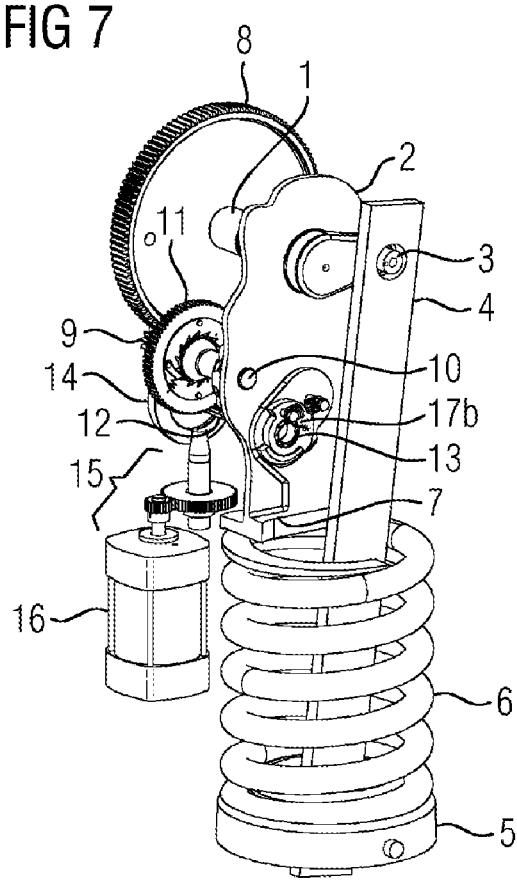
FIG. 7 shows the device known from FIG. 1 shortly after unlatching.
Figure 8:
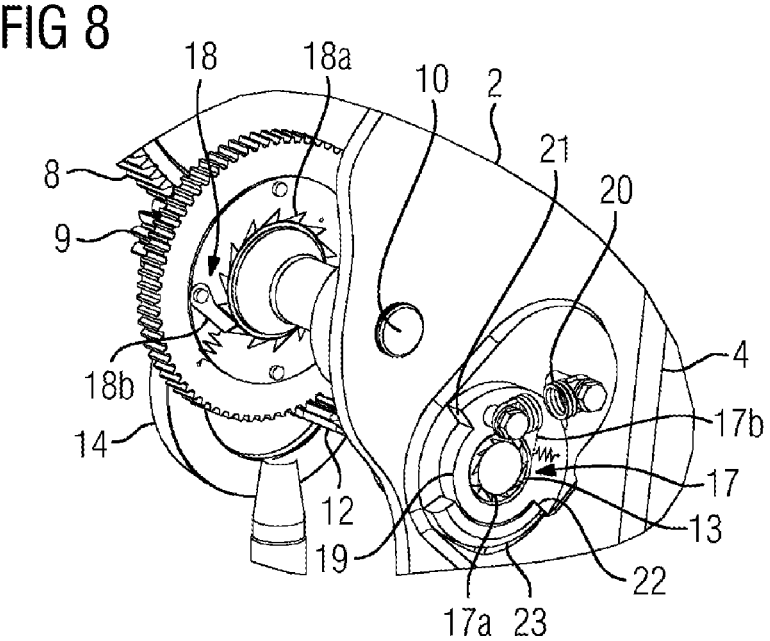
FIG. 8 shows a detail of FIG. 7.

In the case of a reversal of the rotating movement on the tensioning shaft 1, (motion sequence of FIGS. 3, 4, to FIGS. 5, 6), the crank arm 3 will first swing back by a few degrees or tenths of a degree in the direction of the upper dead center. This means that the tensioning shaft 1 henceforth moves in the opposite direction of rotation. The tensioning shaft 1 and the tensioning shaft gear wheel 8 that is fastened thereto pass on the rotating movement counter to the clockwise direction to the sprocket 9 of the first transmission shaft 10. Engaging of the second override clutch 18 takes place by virtue of the reversal of the load flow that arises. The engaged second override clutch 18 also transmits the movement of the first transmission shaft 10 to the first gear wheel 11 which in turn transmits a movement to the second sprocket 12 such that the second transmission shaft 13 moves counter to the clockwise direction. Engaging of the first override clutch 17 arises henceforth. This means that the first override clutch 17 blocks. By virtue of the connection that is rigid in angular terms of the second coupling partner 17b to the sleeve 19 that is mounted so as to be rotatingly movable in the transmission housing 2, this rotating movement can be performed in a limited manner, despite the first override clutch 17 being engaged and blocking. The effect of the engaged coupling partners 17a, 17b of the first override clutch 17 is neutralized by the freewheeling member. Tensioning of the restoring spring 20 arises henceforth in the case of this rotating movement. The restoring spring 20 is tensioned, specifically until the first detent 21 comes into contact with the molding 23 (FIG. 6). Neutralizing of the engaged coupling partners 17a, 17b of the first override clutch 17 is provided until the first detent 21 impacts the molding 23. The blocking effect of the first override clutch is provided in an abrupt manner as the first detent 21 of the sleeve 19 impacts the molding 23, such that a further rotating movement of the second transmission shaft 13 counter to the clockwise direction is blocked.

A reverse movement of this type is presently permitted in order for blocking of the second override clutch 18, triggered by a reversal of the load flow, to be released. The coupling effect of the first override clutch 17 is neutralized at the commencement of a rotating movement of the second transmission shaft 13, and a limited rotating movement of the sleeve 19 in the transmission housing 2 is permitted. It thus possible for blockages of the second override clutch 18 to be released. Wedging or jamming, respectively, of the second override clutch 18 by an undesirable swinging back of the tensioning shaft 1 is prevented.

Upon an impact of the tensioning shaft 1 on a ratchet mechanism the tension spring 6 remains in the tensioned state. There is henceforth the possibility for the ratchet mechanism to be released, and for relaxing of the tensioned storage spring 6 to be performed. The tensioned storage spring 6 henceforth drives a rotation of the crank arm 3 in the clockwise direction, such that the tensioning shaft 1 and the tensioning shaft gear wheel 8 that is located thereon are also moved in the clockwise direction (from FIG. 5, 6, to FIG. 7, 8). This movement in the clockwise direction is also transmitted by way of the first sprocket 9 to the first transmission shaft 10. In turn, the first transmission shaft 10 moves the first coupling partner 18a counter to the clockwise direction, whereupon the second coupling partner 18b disengages (freewheeling function). The first gear wheel 11 remains in a resting position. Consequently, driven by the restoring force of the restoring spring 20, engaging of the coupling partners 17a, 17b of the first override clutch 17 can be performed. The restoring spring 20 by way of the engaged first override clutch 17 drives the second transmission shaft 13 in the clockwise direction. A movement is also transmitted by way of the second sprocket 12 to the first gear wheel 11. The first gear wheel 11 is rotated counter to the clockwise direction. The angular velocity of the first gear wheel 11 herein is less than the angular velocity of the first transmission shaft 10, such that the second override clutch 18 disengages. The mutually deviating angular velocities of the first transmission shaft 10 and of the first gear wheel 11 are determined by the mutually deviating dimensions of the restoring spring 20 and of the storage spring 6. The sleeve 19 is moved back to the resting position thereof (cf. movement of FIGS. 5, 6, to FIGS. 7, 8), such that the freewheeling member is available for a further motion cycle, that is to say for re-tensioning the storage spring 6, or for renewed complete tensioning of the storage spring 6.

The invention claimed is:

1. A device, comprising:
    a transmission assembly having a first override clutch with a first coupling partner rotatably mounted about a rotation axis and a second coupling partner pivotally mounted to selectively engage or disengage said first coupling partner in dependence on a change in a load flow between said first and second coupling partners, wherein, when said first and second coupling partners are engaged, said first coupling partner is locked against rotation in a given direction, and when said first and second coupling partners are disengaged, said first coupling partner is free to rotate in the given direction;
    a freewheeling member functionally associated with said first override clutch and configured for disengaging said first and second coupling partners, said freewheeling member being disposed to surround said first coupling partner and being rotatably mounted relative to said first coupling partner about the rotation axis and coaxially with said first coupling partner.

2. The device according to claim 1, wherein said override clutch is configured for transmitting a torque and said freewheeling member is configured to temporarily disengage said first and second coupling partners.

3. The device according to claim 1, wherein said freewheeling member has a freewheeling path section that is larger than a path section of an engagement movement required for engaging said first and second coupling partners.

4. The device according to claim 1, wherein one of said first and second coupling partners is connected to a first detent.

5. The device according to claim 1, wherein one of said coupling partners is elastically connected to a further transmission element by way of said freewheeling member.

6. The device according to claim 1, wherein said first override clutch is disposed to form a bearing for a shaft.

7. The device according to claim 6, which comprises a second override clutch coupled to the shaft.

8. The device according to claim 7, wherein said first and second override clutches are configured with blocking actions in the same direction.

9. The device according to claim 7, wherein said freewheeling member is configured to effect a destressing of coupling forces on said second override clutch.

10. The device according to claim 1, wherein said freewheeling member is configured to enable a movement relative to a detent by one of said first and second coupling partners.

11. The device according to claim 10, wherein said freewheeling member is configured to enable the movement relative to the delimitation detent by said one coupling partner in an engaged state.

12. The device according to claim 1, wherein said freewheeling member is configured, in the case of a change in the load flow of said first and second coupling partners, to automatically reset itself.

13. The device according to claim 1, which further comprises a spring-loaded mechanism.

\* \* \* \* \*